(12) United States Patent
Terauchi

(10) Patent No.: US 9,052,008 B2
(45) Date of Patent: Jun. 9, 2015

(54) DRIVE APPARATUS AND CONSTRUCTION MACHINE PROVIDED WITH SAME

(75) Inventor: Kenichi Terauchi, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 73 days.

(21) Appl. No.: 13/992,778

(22) PCT Filed: Nov. 29, 2011

(86) PCT No.: PCT/JP2011/006630
§ 371 (c)(1),
(2), (4) Date: Jun. 10, 2013

(87) PCT Pub. No.: WO2012/077295
PCT Pub. Date: Jun. 14, 2012

(65) Prior Publication Data
US 2013/0255422 A1    Oct. 3, 2013

(30) Foreign Application Priority Data

Dec. 9, 2010    (JP) .................................. 2010-274466

(51) Int. Cl.
*F16H 57/02*    (2012.01)
*F16H 57/04*    (2010.01)
*F16H 61/00*    (2006.01)
*F16H 57/027*    (2012.01)
*E02F 9/12*    (2006.01)

(52) U.S. Cl.
CPC ......... *F16H 57/027* (2013.01); *Y10T 74/19991* (2015.01); *E02F 9/123* (2013.01); *E02F 9/128* (2013.01); *F16H 57/04* (2013.01); *F16H 57/0443* (2013.01); *F16H 57/0486* (2013.01)

(58) Field of Classification Search
CPC ... F16H 57/027; F16H 57/0486; F16H 57/04; F16H 57/0423; F16H 57/042; F16H 57/0469; F16H 57/0476
USPC ........ 74/421 A, 606 R, 606 A, 607, 380, 467; 475/159, 160
See application file for complete search history.

(56) References Cited

U.S. PATENT DOCUMENTS

| 6,335,580 | B1 * | 1/2002 | Cognigni et al. | ............... 310/89 |
| 6,719,096 | B2 * | 4/2004 | Mogi | ........................... 184/6.23 |
| 2002/0112802 | A1 * | 8/2002 | D'Amico et al. | ............. 152/415 |
| 2004/0195044 | A1 * | 10/2004 | Kimura et al. | ............... 184/6.23 |
| 2009/0127954 | A1 * | 5/2009 | Mogi | .............................. 310/90 |
| 2013/0192400 | A1 * | 8/2013 | Dodo et al. | .................. 74/421 A |

FOREIGN PATENT DOCUMENTS

| JP | 2 10759 | 1/1990 |
| JP | 9 48250 | 2/1997 |
| JP | 10 281263 | 10/1998 |
| JP | 2002 357260 | 12/2002 |
| JP | 2004 232500 | 8/2004 |
| JP | 2008 232269 | 10/2008 |
| JP | 2008 232270 | 10/2008 |
| JP | 2009 124822 | 6/2009 |

OTHER PUBLICATIONS

International Search Report Issued Jan. 10, 2012 in PCT/JP11/06630 Filed Nov. 29, 2011.

* cited by examiner

*Primary Examiner* — William Kelleher
*Assistant Examiner* — Jake Cook
(74) *Attorney, Agent, or Firm* — Oblon, McClelland, Maier & Neustadt, L.L.P.

(57) ABSTRACT

A drive apparatus which is compact in a height direction and a diametrical direction and with which a sufficient air breather function can be obtained, and a construction machine including the drive apparatus. The drive apparatus includes an electric motor and a speed reducer. An interior of a motor housing communicates with a speed reducer chamber such that a flow of air between the speed reducer chamber and the interior of the motor housing is permitted while limiting inflow of lubricating oil into the interior of the motor housing from the speed reducer chamber. An air breather passage and an air breather pipe for opening the interior of the motor housing to the atmosphere are provided in the motor housing.

11 Claims, 4 Drawing Sheets

DRIVE APPARATUS AND CONSTRUCTION MACHINE PROVIDED WITH SAME

TECHNICAL FIELD

The present invention relates to a drive apparatus for reducing speed of a rotation force of an electric motor serving as a drive source using a speed reducer, and transmitting the reduced rotation force to a driven portion such as an upper slewing body in a construction machine such as a shovel.

BACKGROUND ART

The related art will now be described, using a slewing drive apparatus for a shovel as an example.

A shovel includes a crawler type lower propelling body, an upper slewing body installed on the lower propelling body rotatably around a shaft vertical to the ground, and a work attachment attached to the upper slewing body.

Here, a hybrid shovel or an electric shovel includes a slewing drive apparatus for causing the upper slewing body to slew. The slewing drive apparatus includes an electric motor (also referred to simply as a motor hereafter) serving as a drive source, and a speed reducer that reduces speed of a rotation force of the motor and transmits the reduced rotation force to the upper slewing body serving as a driven portion.

The motor includes a motor shaft, and the speed reducer includes a speed reducer output shaft connected to the motor shaft. The motor and the speed reducer are provided in a row in an axial direction of the slewing drive apparatus (to be referred to hereafter as a apparatus-axis direction) such that both center axes (the motor shaft and the speed reducer output shaft) are located along the same line. Further, the motor and the speed reducer are mounted to an upper frame in such a vertical arrangement that the motor is located at a top.

The speed reducer includes a casing surrounding a speed reducer chamber, and a speed reduction mechanism that is provided in the speed reducer chamber and includes at least single-stage planetary gear mechanism, for example. The planetary gear mechanism includes a sun gear, a planetary gear, and a ring gear. An output of the speed reducer is transmitted to the upper slewing body via a pinion provided on the speed reducer output shaft and a slewing gear provided on a lower frame of the lower propelling body.

Lubricating oil for lubricating the speed reduction mechanism is injected into the speed reducer chamber (the casing). When the drive apparatus is operative, a temperature of the lubricating oil increases, and as a result of this temperature increase, a volume of the lubricating oil expands. Accordingly, an oil level of the lubricating oil rises, and as a result of the rising oil level, the lubricating oil may overflow. Further, when an internal pressure of the speed reducer chamber increases, a structure for sealing the motor shaft that is introduced into the speed reducer chamber may be damaged.

Hence, in a conventional technique (see Patent Documents 1 and 2, for example) for suppressing overflow of the lubricating oil and damage to the structure for sealing the motor shaft, an air chamber provided in a connecting part between the motor and the speed reducer is maintained at a pressure corresponding to atmospheric pressure (this function will be referred to hereafter as an air breather function). More specifically, in this technique, a part (to be referred to hereafter as an air breather) that enables the air chamber to communicate with the outside is provided to maintain the interior of the air chamber at a pressure corresponding to atmospheric pressure.

Meanwhile, a nacelle slewing drive apparatus for a wind power generation facility described in Patent Document 3 includes a clutch and a brake provided between a motor and a speed reducer, and an air chamber and an air breather disposed on an outer periphery of the clutch and brake.

The technique of providing a dedicated air chamber having an air breather function, as described in Patent Documents 1 and 2, is basically achieved by adding the air chamber between the motor and the speed reducer, and therefore an overall length (overall height) dimension of the device increases. As a result, a large space is required to install the drive apparatus.

It is therefore particularly difficult to dispose the drive apparatus described in Patent Documents 1 and 2 in a construction machine such as a shovel, in which space for installing the drive apparatus is limited in both a height direction and a horizontal direction. More specifically, a torque per unit size of an electric motor serving as a slewing drive source is smaller than that of a hydraulic motor. Therefore, an electric motor used to obtain an equivalent torque to that of a hydraulic motor is larger than a hydraulic motor, and as a result, the space for installing the drive apparatus is limited in the height direction and the horizontal direction.

Since the height dimension of the air chamber in an actual device is limited, it is impossible to secure sufficient volume in the air chamber. As a result, the air breather function may not be realized sufficiently.

In the technique described in Patent Document 1, the air chamber is connected to a buffer tank disposed on the outside of the speed reducer by a passage, and therefore an internal volume of the buffer tank is used as a part of the air chamber.

However, the buffer tank is disposed on the outside of the speed reducer under the premise that since the oil level of the lubricating oil takes the funnel-shape during an operation, the lubricating oil will flow into the buffer tank. During an operation on sloping ground, therefore, the lubricating oil likewise flows into the buffer tank due to the tilt of the construction machine. When, in this condition, the oil temperature is increased by direct sunlight or the like, air in the buffer tank expands, and as a result, the lubricating oil may overflow.

In other words, the air breather function is not realized sufficiently even with a configuration employing a buffer tank.

Furthermore, since the buffer tank is disposed on the outside of the speed reducer, a diameter dimension of the drive apparatus increases. As a result, a large space is required to install the drive apparatus in a construction machine.

In the technique described in Patent Document 3, meanwhile, the air chamber is formed on the outer periphery of the clutch and brake. Therefore, when an air chamber having a large enough volume to realize a sufficient air breather function is formed, height direction and diametrical direction dimensions of the drive apparatus increase.

In other words, although the technique described in Patent Document 3 can be put to practical use in a wind power generation facility having substantially no dimensional limitations, the technique cannot easily be applied to a construction machine having severe dimensional limitations, such as a shovel.

Patent Document 1: Japanese Patent Application Publication No. 2008-232270

Patent Document 2: Japanese Patent Application Publication No. 2002-357260

Patent Document 3: Japanese Patent Application Publication No. 2004-232500

SUMMARY OF THE INVENTION

An object of the present invention is to provide a drive apparatus which is compact in a height direction and a diametrical direction and with which a sufficient air breather function can be obtained, and a construction machine including the drive apparatus.

To solve the problems described above, the present invention provides a drive apparatus for a construction machine, including: an electric motor serving as a drive source and having a motor shaft and a motor housing; and a speed reducer that includes a speed reducer output shaft for transmitting a force to a driven portion, a speed reduction mechanism that reduces a rotation force of the motor shaft and transmits the reduced rotation force to the speed reducer output shaft, and a casing surrounding a speed reducer chamber in which the speed reduction mechanism is housed and lubricating oil is injected, and that is provided below the electric motor such that the motor shaft and the speed reducer output shaft are disposed on an identical line, wherein an interior of the motor housing communicates with the speed reducer chamber such that a flow of air between the speed reducer chamber and the interior of the motor housing is permitted while limiting inflow of the lubricating oil into the interior of the motor housing from the speed reducer chamber, and an air breather for opening the interior of the motor housing to the atmosphere is provided in the motor housing.

The present invention also provides a construction machine including the drive apparatus described above, and a driven portion driven by the force transmitted via the speed reducer.

According to the present invention, a sufficient air breather function can be obtained while achieving compactness in a height direction and a diametrical direction.

BEST MODE FOR CARRYING OUT THE INVENTION

An embodiment of the present invention will be described below with reference to the attached drawings. Note that the following embodiment is a specific example of the present invention, and is not intended to limit the technical scope of the present invention.

The embodiment to be described below is applied to a slewing drive apparatus for a shovel.

Note, however, that the present invention may also be applied to another drive apparatus in which a motor and a speed reducer are arranged in a row in a apparatus-axis direction (a vertical direction) such that a motor shaft of the motor and a speed reducer output shaft of the speed reducer are arranged along the same line, and lubricating oil is injected into a casing of the speed reducer.

First Embodiment (see FIGS. 1 to 4)

Figure 1:
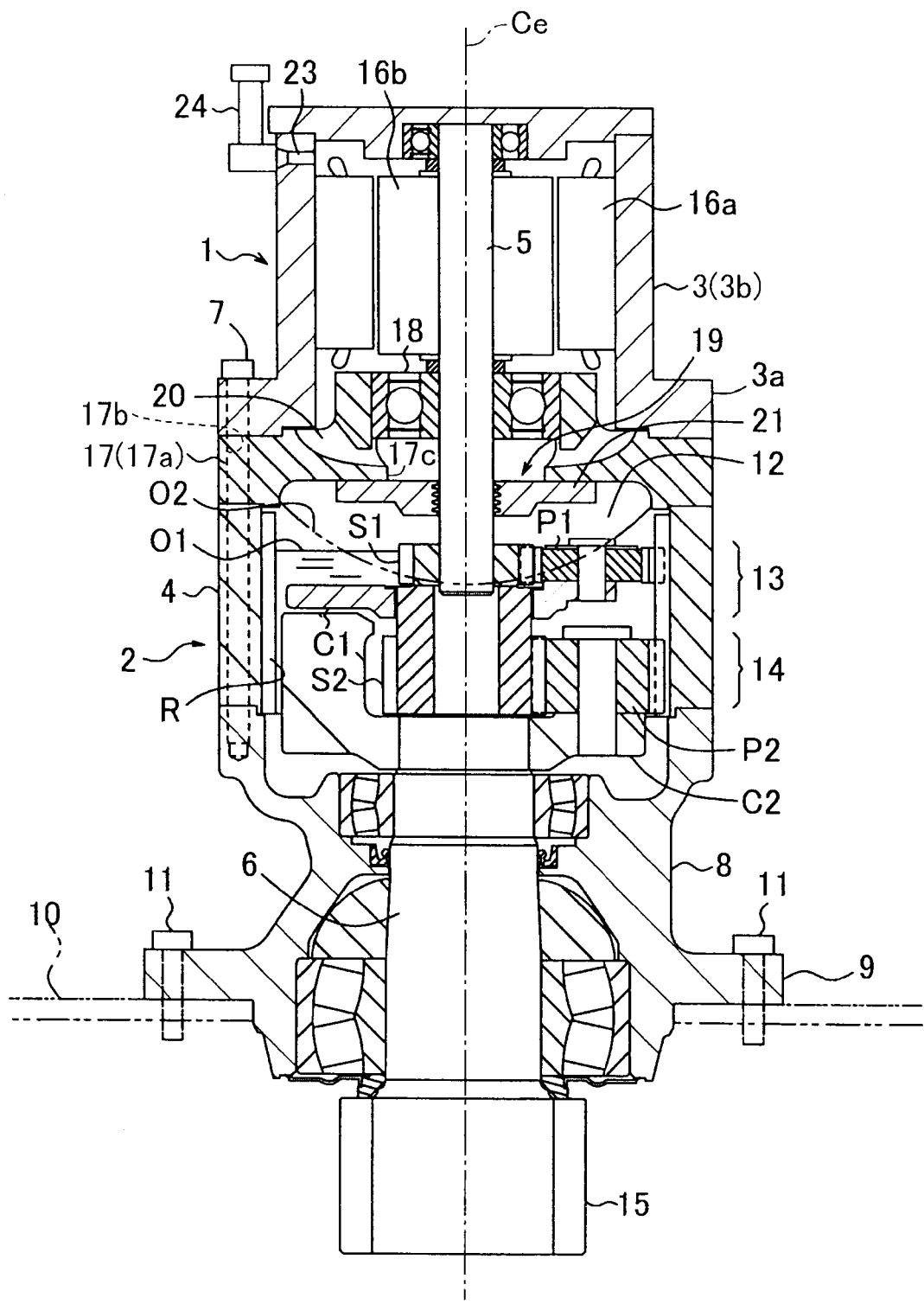
FIG. 1 is a sectional view of a slewing drive apparatus according to a first embodiment of the present invention.

A slewing drive apparatus shown in FIG. 1 includes an electric motor (to be referred to simply as a motor hereafter) 1 serving as a drive source, and a speed reducer 2 that reduces speed of a rotation force of the motor 1 and transmits the reduced rotation force to an upper slewing body serving as a driven portion. The motor 1 and the speed reducer 2 are arranged in a row in a apparatus-axis direction.

The motor 1 includes a motor shaft 5, a rotation mechanism for applying a rotation force to the motor shaft 5, a motor housing 3 that houses the rotation mechanism, and a partition wall (a motor side partition wall) 17 provided below the motor housing 3.

The rotation mechanism includes a rotor 16b attached to an outer periphery of the motor shaft 5, and a stator 16a fixed to an inner periphery of the motor housing 3.

The motor housing 3 includes a tubular housing main body 3b that surrounds the rotation mechanism, and a flange 3a that projects to an outer periphery from a lower end portion of the housing main body 3b.

The partition wall 17 partitions an interior of the motor housing 3 from a speed reducer chamber 12 to be described below. A specific configuration of the partition wall 17 will be described below.

The speed reducer 2 includes at least single-stage planetary gear mechanism (two-stage planetary gear mechanisms are shown in FIG. 1, and therefore a case in which two-stage planetary gear mechanisms are provided will be described below) 13, 14, a casing 4 surrounding the speed reducer chamber 12, in which the planetary gear mechanisms 13, 14 are housed and lubricating oil O is injected, a speed reducer output shaft 6 that is connected to the respective planetary gear mechanisms 13, 14 and projects from the casing 4, and a shaft support portion 8 that supports the speed reducer output shaft 6 rotatably.

The motor 1 and the speed reducer 2 are arranged in a row in the apparatus-axis direction (a vertical direction) such that the motor shaft 5 and the speed reducer output shaft 6 are arranged along the same center line Ce. More specifically, the motor 1 and the speed reducer 2 are mounted to a construction machine in such a vertically arranged state that the motor 1 is located at a top and the motor 1 and the speed reducer 2 are provided in a row in the apparatus-axis direction. The flange 3a provided on the lower end of the motor housing 3 and the casing 4 are connected detachably by a plurality of connecting bolts 7.

The shaft support portion 8 is provided on a lower end of the speed reducer 2 (below the casing 4), and has therein a bearing (not having a reference symbol) that rotatably supports the speed reducer output shaft 6. The shaft support portion 8 is provided with an attachment flange 9 that projects to an outer periphery from a lower portion thereof. The attachment flange 9 can be attached to an upper frame 10 of the upper slewing body by a plurality of attachment bolts 11.

The casing 4 houses the two-stage planetary gear mechanisms 13, 14 arranged coaxially. Further, the lubricating oil O is injected into the casing 4 over the substantially whole length of the casing 4. More specifically, the lubricating oil O is injected over a range extending from a bottom surface of the casing 4 to a position slightly below an upper end surface of the casing 4 (a lower end surface of the partition wall 17 to be described below).

Figure 2:
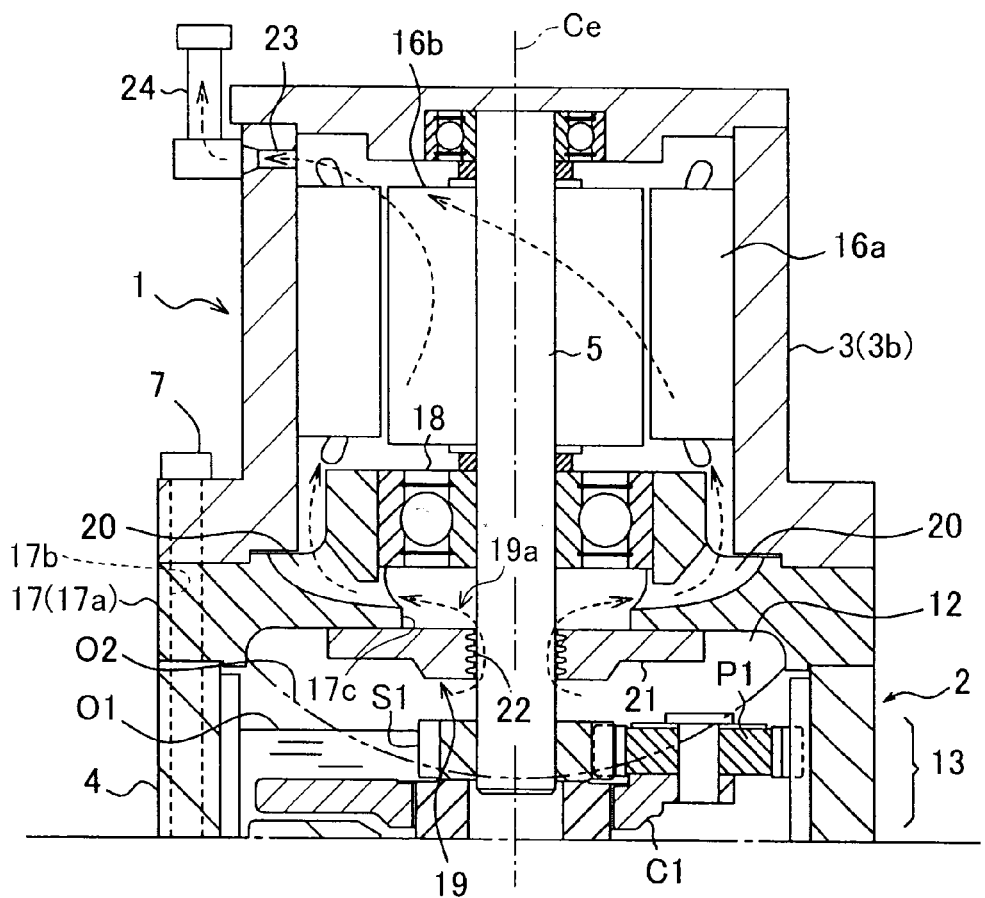
FIG. 2 is a partially enlarged view of FIG. 1.

During a stoppage, an oil level of the lubricating oil O is horizontal, as shown by a reference symbol O1 in FIGS. 1 and 2. During an operation, on the other hand, an outer peripheral side of the lubricating oil O is raised by a centrifugal force such that the oil level of the lubricating oil O takes the funnel-shape, as shown by a reference symbol O2 in FIGS. 1 and 2.

The respective planetary gear mechanisms 13, 14 reduce speed of the rotation force of the motor shaft 5 and transmit the reduced rotation force to the speed reducer output shaft 6. The speed reducer output shaft 6 transmits the rotation force received from the motor shaft 5 to the upper frame 10 (the upper slewing body) serving as the driven portion. More specifically, the planetary gear mechanisms 13, 14 respectively include sun gears S1, S2, carriers C1, C2, pluralities of planetary gears P1, P2 provided around the sun gears S1, S2 via the carriers C1, C2, and ring gears R provided on an inner periphery of the casing 4. The respective planetary gear mechanisms 13, 14 make the planetary gears P1, P2 revolve while making the planetary gears P1 and P2 rotate on their own axes, thereby reducing the speed of the rotation of motor 1. The reduced rotation force of the motor 1 is transmitted to the speed reducer output shaft 6, and then transmitted to the upper frame 10 via a pinion 15 provided on a lower end of the speed reducer output shaft 6 and a slewing gear (a ring gear, not shown) meshed to the pinion 15.

The partition wall 17 partitions the interior of the motor housing 3 from the speed reducer chamber 12 when penetrated by the motor shaft 5. More specifically, the partition wall 17 is provided in a lower portion of the motor housing 3 (between the motor housing 3 and the casing 4). Further, the partition wall 17 includes a partition wall main body 17a formed in a ring shape, a grease lubrication bearing 18 provided on the partition wall main body 17a in order to support an intermediate portion of the motor shaft 5, and a shaft sealing mechanism (a motor side shaft sealing mechanism) 19 that seals a periphery of the motor shaft 5 below the bearing 18.

A plurality of insertion holes 17b are formed in a vertical direction in a peripheral edge portion of the partition wall main body 17a. By inserting the connecting bolts 7 into the insertion holes 17b in the partition wall main body 17a disposed between the motor housing 3 and the casing 4, the partition wall main body 17a is attached to the motor housing 3 and the casing 4. Further, a penetration hole 17c that can be penetrated by the motor shaft 5 is formed in a central portion of the partition wall main body 17a along the center line Ce. Furthermore, a connecting hole 20 that connects a space above the partition wall main body 17a to a space between the shaft sealing mechanism 19 and the bearing 18 in the penetration hole 17c is formed in the partition wall main body 17a.

The shaft sealing mechanism 19 limits a flow of the lubricating oil O between the partition wall 17 (the partition wall main body 17a) and the motor shaft 5. As shown by the enlargement in FIG. 3, the shaft sealing mechanism 19 according to this embodiment is a non-contact type hermetic sealing mechanism in which a minute gap (a motor side air passage) 22 is formed between the shaft sealing mechanism 19 and the motor shaft 5 when the motor shaft 5 is inserted. A specific configuration of the shaft sealing mechanism 19 will be described below.

Figure 3:
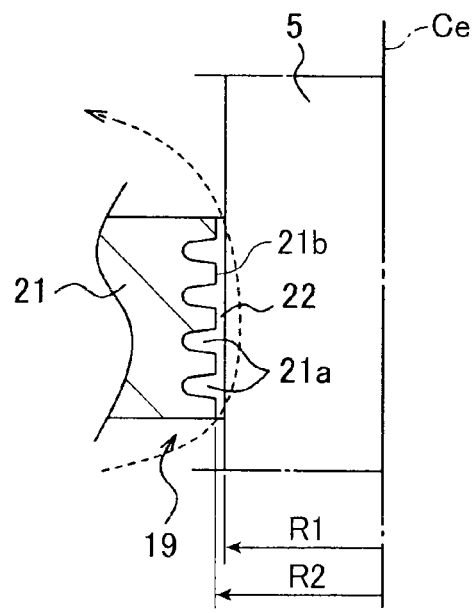
FIG. 3 is a partially enlarged view of FIG. 2.

The shaft sealing mechanism 19 includes a ring-shaped seal plate 21 that is fixed to the partition wall main body 17a. The seal plate 21 is attached to the partition wall main body 17a so as to block the penetration hole 17c such that flows of the lubricating oil O and air between the partition wall main body 17a and the seal plate 21 are limited. Further, an insertion hole 21b into which the motor shaft 5 can be inserted is formed in the seal plate 21 along the center line Ce. As shown in FIG. 3, an inner diameter dimension R2 of the insertion hole 21b is larger than an outer diameter dimension R1 of the motor shaft 5. Therefore, the gap 22 is formed between an inside surface of the insertion hole 21b and an outside surface of the motor shaft 5 at a width that corresponds to a difference (R2−R1) between the respective radii R1, R2. The gap 22 forms an air passage (hereafter, the gap 22 will be referred to as an air passage) that allows air to flow between the speed reducer chamber 12 and the interior of the motor housing 3 while limiting inflow of the lubricating oil O between the speed reducer chamber 12 and the interior of the motor housing 3.

Further, a plurality of oil grooves 21a capable of holding the lubricating oil O are formed in the inside surface of the insertion hole 21b in the seal plate 21. In other words, the shaft sealing mechanism 19 constitutes an "oil groove sealing structure".

Note that an oil groove sealing mechanism having oil grooves may also be employed on an outer peripheral surface of the motor shaft 5. A "gap sealing structure" not having oil grooves may also be employed.

Further, a "radial labyrinth sealing structure" in which a labyrinth passage is formed in a radial direction between the motor shaft 5 and the seal plate 21 may be employed. Alternatively, an "aligning labyrinth sealing structure" in which the labyrinth passage is formed so as to be inclined may be employed.

Thus, the partition wall main body 17a and the seal plate 21 constitute a bottom wall of an interior chamber of the motor housing 3. As a result, the interior of the motor housing 3 and the speed reducer chamber 12 are connected to each other via the air passage 22 and the connecting hole 20.

Further, a part of an upper surface of the bottom wall of the interior chamber of the motor housing 3 constituted by the partition wall main body 17a and the seal plate 21 is recessed relative to other parts to form a recessed portion (a motor side recessed portion) 19a. In other words, the recessed portion 19a is formed in the partition wall 17. More specifically, in this embodiment, the seal plate 21 is attached to a lower surface of the partition wall such that a step is formed between the seal plate 21 and the partition wall main body 17a.

Here, the motor shaft 5 is inserted into the seal plate 21 in a region constituting a bottom portion of the recessed portion 19a. In other words, the air passage 22 is formed in the region constituting the bottom portion of the recessed portion 19a.

Meanwhile, a tunnel-shaped air breather passage 23 for leading air in the interior of the motor housing 3 to the outside is formed horizontally in the housing main body 3b of the motor housing 3. The air breather passage 23 communicates with the outside of the motor housing 3 via an air breather pipe 24. The air breather pipe 24 is formed in the shape of a chimney that extends upward from an outside surface of the housing main body 3b.

Hence, the speed reducer chamber 12 is open to the atmosphere via the air passage 22, the connecting hole 20, the air breather passage 23, and the air breather pipe 24. In other words, the air passage 22, the connecting hole 20, the air breather passage 23, and the air breather pipe 24 together constitute an air breather that realizes an air breather function by connecting the speed reducer chamber 12 to the atmosphere via the interior space of the motor housing 3. The interior chamber of the motor housing 3 is used as an air chamber.

Next, a flow of air through the drive apparatus will be described. Dotted line arrows in FIGS. 2 and 3 represent a flow of air that passes through the interior of the motor housing 3 from the speed reducer chamber 12 and then escapes to the outside. More specifically, the air in the speed reducer chamber 12 is introduced into the interior of the motor housing 3 through the air passage 22 and the connecting hole 20, as shown in FIGS. 2 and 3, as the temperature of the lubricating oil O increases and so on. The air in the interior of the motor housing 3 passes successively through the air breather passage 23 and the air breather pipe 24, and is thus led to the outside of the motor housing 3. Air on the outside of the motor housing 3, meanwhile, is introduced into the speed reducer chamber 12 along an opposite path to that described above.

As described above, the inventors of the present application arrived at the invention described above, in which the interior of the motor housing 3 of the motor 1 doubles as the air chamber of the air breather, by focusing on the fact that a dry space including no oil is formed in the interior of the motor housing 3. By causing the interior of the motor housing 3 to double as an air chamber, there is no need to add a dedicated air chamber to the air breather.

Further, a torque per unit size of the electric motor 1 is smaller than that of a hydraulic motor. Therefore, the electric motor 1, which is used to obtain an equivalent torque to that of a hydraulic motor, is larger than a hydraulic motor. Accordingly, the motor housing 3 originally has a large enough volume to realize the air breather function. Hence, there is no need to increase the size of the drive apparatus in the height direction and the diametrical direction when causing the interior of the motor housing 3 to double as an air chamber.

Further, by partitioning the interior of the motor housing 3 from the speed reducer chamber 12 using the partition wall 17 and the shaft sealing mechanism 19 provided thereon, inflow of the lubricating oil O from the speed reducer chamber 12 can be limited. As a result, the entire interior space of the motor housing 3 can be caused to function as an air chamber.

There is therefore no need to enlarge the interior space of the motor housing 3 in the height direction and the diametrical direction of the drive apparatus.

Hence, a sufficient air breather function can be secured while achieving compactness in the height direction and the diametrical direction. As a result, the drive apparatus can be installed easily even in a construction machine having severe space limitations, such as a shovel.

Furthermore, the shaft sealing mechanism 19 is provided in the part of the partition wall 17 partitioning the interior of the motor housing 3 from the speed reducer chamber 12 that is penetrated by the motor shaft 5. Therefore, infiltration of the lubricating oil O into the interior of the motor housing 3 during an operation can be suppressed. More specifically, during an operation, the oil level of the lubricating oil takes the funnel-shape, and therefore the likelihood of the lubricating oil O contacting (infiltrating) the part of the partition wall 17 penetrated by the motor shaft 5 is low.

Figure 4:
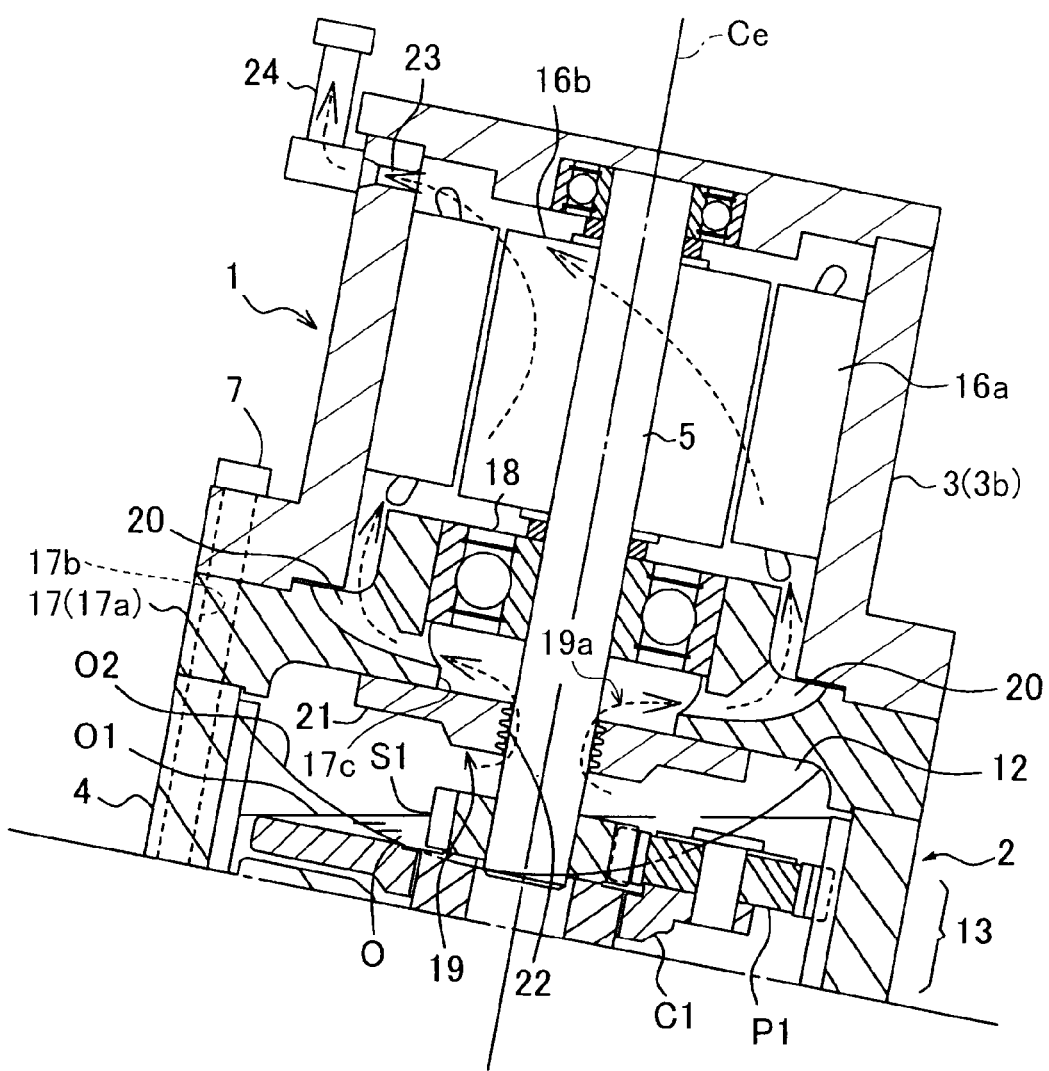
FIG. 4 is a view corresponding to FIG. 2, showing a condition of lubricating oil when a machine is tilted.

Moreover, the air passage 22 is provided in the part of the partition wall 17 penetrated by the motor shaft 5. In other words, the air passage 22 is provided in the part penetrated by the motor shaft 5, where the oil level of the lubricating oil O during an operation is at a minimum and the lubricating oil O is unlikely to infiltrate even in a tilted condition. Hence, even during an operation performed in a tilted condition on sloping ground, as shown in FIG. 4, the lubricating oil O is less likely to contact the air passage 22 than when the air passage is formed on the outer peripheral side, and therefore the lubricating oil O is unlikely to infiltrate the interior of the motor housing 3 through the air passage 22.

As a result, the air breather function can be secured at all times, even during an operation on sloping ground, and overflow of the lubricating oil can be prevented reliably.

Additionally, the recessed portion 19a is formed in the partition wall 17 by recessing a part of the upper surface of the partition wall 17 relative to the other parts thereof, and the air passage 22 is formed in the region constituting the bottom portion of the recessed portion 19a. Hence, even if the lubricating oil O infiltrates the interior of the motor housing 3 from the speed reducer chamber 12, the lubricating oil O is highly likely to flow to the bottom portion of the recessed portion 19a and then return to the speed reducer chamber 12 through the air passage 22.

Figure 5:
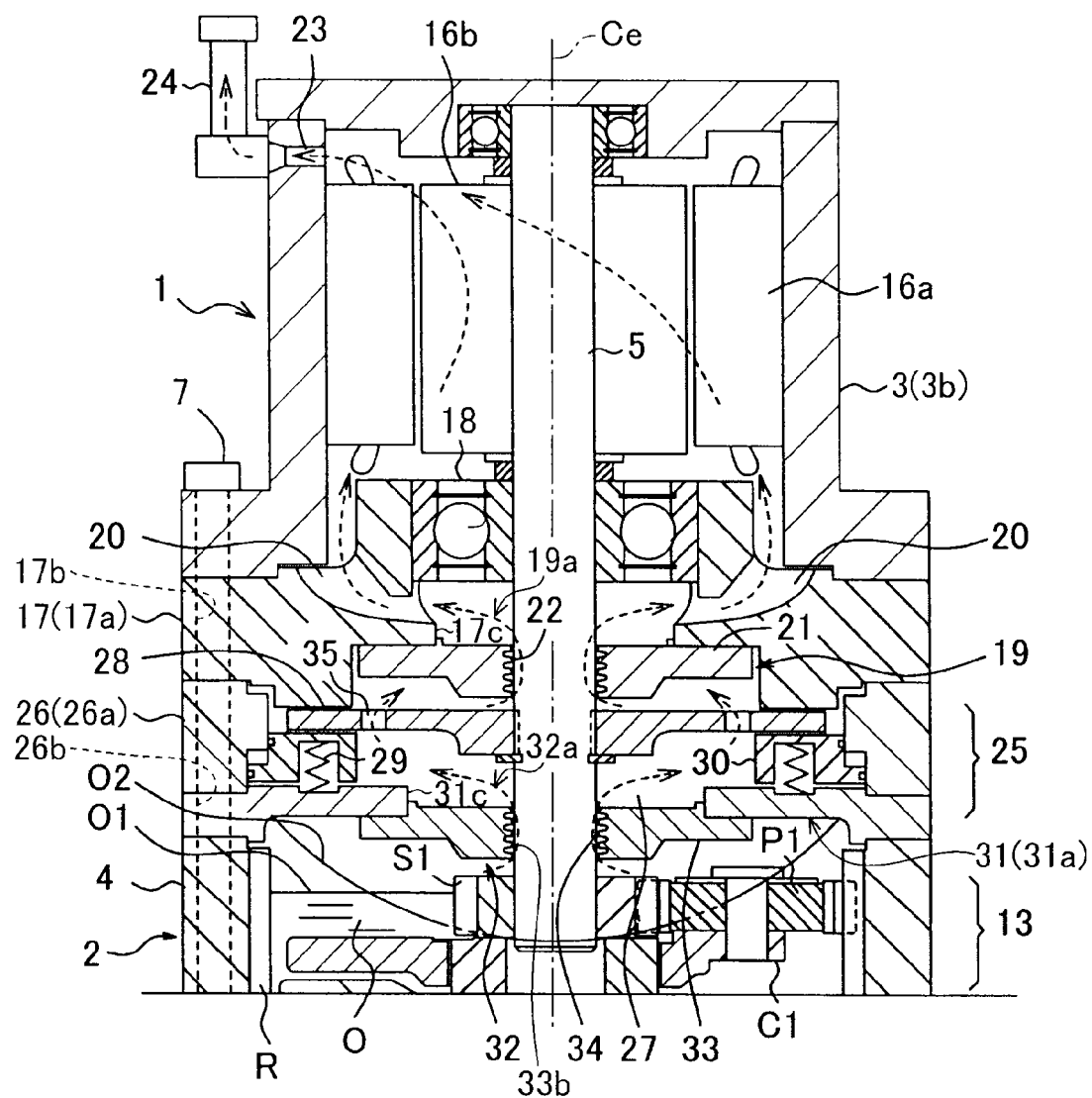
FIG. 5 is a view corresponding to FIG. 2, showing a slewing drive apparatus according to a second embodiment of the present invention.

Second Embodiment (see FIG. 5)

Only differences with the first embodiment will be described.

A drive apparatus according to the second embodiment is a slewing drive apparatus having a brake. More specifically, the slewing drive apparatus having a brake includes a dry brake 25 that is provided between the motor 1 and the speed reducer 2 and applies a braking force to the motor shaft 5.

In the second embodiment, following points (I), (II), and (III) are similar to the first embodiment.

(I) The partition wall 17 is provided in the lower portion of the motor housing 3 (between the brake 25 and the motor housing 3). The partition wall 17 includes the partition wall main body 17a, the grease lubrication bearing 18, and the shaft sealing mechanism 19 having an oil groove sealing structure including an air passage.

(II) The bottom wall of the interior chamber of the motor housing 3 is formed by the partition wall 17 and the seal plate 21 provided thereon. The recessed portion 19a is formed in the bottom wall (the partition wall 17) by recessing a part of the upper surface of the bottom wall relative to the other parts. The shaft sealing mechanism 19 is formed in the region constituting the bottom portion of the recessed portion 19a of the partition wall 17.

(III) The air breather passage 23 and the air breather pipe 24 are provided in the housing main body 3b of the motor housing 3.

The brake 25 includes a brake mechanism for applying a brake to the motor shaft 5, and a brake housing 26 surrounding a brake chamber 27 that houses the brake mechanism.

The brake mechanism is a negative brake having a brake disc 28 that is splined to the motor shaft 5 and a brake pad 30 that generates a braking force when pressed against the brake disc 28 by a spring 29. More specifically, when oil pressure is supplied to the brake mechanism from an external oil pressure source, the brake pad 30 separates from the brake disc 28. As a result, the brake disc 28 is released from the braking force.

The brake housing 26 surrounds the brake chamber 27 in which the brake mechanism is housed. More specifically, the brake housing 26 includes a peripheral wall 26a surrounding the brake mechanism about the center line Ce, and a partition wall (a brake side partition wall) 31 projecting inwardly from the peripheral wall 26a. An insertion hole 26b into which the connecting bolt 7 can be inserted is formed within a thickness range of the peripheral wall 26a. The connecting bolt 7 is inserted by screwing in a condition where the peripheral wall 26a is sandwiched between the partition wall 17 of the motor housing 3 and the casing 4 of the speed reducer 2. As a result, the brake 25 is fixed between the speed reducer 2 and the motor 1.

The partition wall 31 partitions the speed reducer chamber 12 from the brake chamber 27 when penetrated by the motor shaft 5. More specifically, the partition wall 31 includes a partition wall main body 31a formed in a ring shape, and a shaft sealing mechanism (a brake side shaft sealing mechanism) 32 provided in a central portion of the partition wall main body 31a. A penetration hole 31c that can be penetrated by the motor shaft 5 is formed in the central portion of the partition wall main body 31a along the center line Ce.

Note that in order to differentiate between the partition wall 17 and shaft sealing mechanism 19 on the motor housing 3 side and the partition wall 31 and shaft sealing mechanism 32 on the brake housing 26 side, the former will be referred to hereafter as the upper portion partition wall 17 and the upper portion shaft sealing mechanism 19, while the latter will be referred to as the lower portion partition wall 31 and the lower portion shaft sealing mechanism 32.

The lower portion shaft sealing mechanism 32 limits a flow of the lubricating oil O between the lower portion partition wall 31 (the partition wall main body 31a) and the motor shaft 5. Similarly to the upper portion shaft sealing mechanism 19, the lower portion shaft sealing mechanism 32 according to this embodiment is a non-contact type hermetic sealing mechanism in which a minute gap 34 is formed between the upper portion shaft sealing mechanism 32 and the motor shaft 5 when the motor shaft 5 is inserted. A specific configuration of the lower portion shaft sealing mechanism 32 will be described below.

The lower portion shaft sealing mechanism 32 includes a ring-shaped seal plate 33 that is fixed to the partition wall main body 31a. The seal plate 33 is attached to the partition wall main body 31a so as to block the penetration hole 31c such that flows of the lubricating oil O and air between the partition wall main body 31a and the seal plate 33 are limited. Further, an insertion hole 33b into which the motor shaft 5 can be inserted is formed in the seal plate 33 along the center line Ce. Similarly to the first embodiment, an inner diameter dimension of the insertion hole 33b is larger than the outer diameter dimension R1 (see FIG. 3) of the motor shaft 5. Therefore, the gap 34 is formed between an inside surface of the insertion hole 33b and the outside surface of the motor shaft 5 at a width that corresponds to a difference between the respective radii. The gap 34 forms a brake side air passage (hereafter, the gap 34 will be referred to as an air passage) that allows air to flow between the speed reducer chamber 12 and the brake chamber 27 while limiting inflow of the lubricating oil O into the brake chamber 27 from the speed reducer chamber 12.

Further, a plurality of oil grooves (not having a reference symbol) are formed in the inside surface of the insertion hole 33b in the seal plate 33. In other words, the lower portion shaft sealing mechanism 32 constitutes an "oil groove sealing structure".

Note that likewise in the lower portion shaft sealing mechanism 32, similarly to the upper portion shaft sealing mechanism 19, an oil groove sealing mechanism having oil grooves may also be employed on the outer peripheral surface of the motor shaft 5. Further, the "gap sealing structure", the "radial labyrinth sealing structure" or the "aligning labyrinth sealing structure" described above may also be employed.

Thus, the lower portion partition wall main body 31a and the seal plate 33 together constitute a bottom wall of the brake chamber 27. As a result, the speed reducer chamber 12 and the brake chamber 27 are connected by the air passage 34 alone.

Further, a part of an upper surface of the bottom wall of the brake chamber 27 constituted by the lower portion partition wall main body 31a and the seal plate 33 is recessed relative to the other parts to form a recessed portion (a brake side recessed portion) 32a. In other words, the recessed portion 32a is formed in the partition wall 31. More specifically, similarly to the seal plate 21 of the upper portion shaft sealing mechanism 19, the seal plate 33 is attached to a lower surface of the partition wall such that a step is formed between the seal plate 33 and the partition wall main body 31a.

Note that at least one air vent 35 is provided in the brake disc 28 to connect an upper portion space and a lower portion space of the brake disc 28 to each other.

The air passage 34 in the lower portion shaft sealing mechanism 32, the brake chamber 27, the air vent 35, the air passage 22 in the upper portion shaft sealing mechanism 19, the connecting hole 20, the interior of the motor housing 3, the air breather passage 23, and the air breather pipe 24 together constitute an air breather that realizes an air breather function by connecting the speed reducer chamber 12 to the atmosphere.

Next, a flow of air through the drive apparatus will be described. Dotted line arrows in FIG. 5 represent a flow of air that is passed through the brake chamber 27 and the interior of the motor housing 3 from the speed reducer chamber 12 by the air breather and then escapes to the outside. More specifically, the air in the speed reducer chamber 12 is introduced into the brake chamber 27 through the air passage 34 as the temperature of the lubricating oil O increases and so on. The air in the brake chamber 27 is introduced into the interior of the motor housing 3 via the air vent 35, the air passage 22, and the connecting hole 20. The air in the interior of the motor housing 3 is led to the outside of the motor housing 3 through the air breather passage 23 and the air breather pipe 24. Air on the outside of the motor housing 3, meanwhile, is introduced into the speed reducer chamber 12 along an opposite path to that described above.

In the second embodiment, the lower portion partition wall 31 is provided to partition the brake chamber 27 from the speed reducer chamber 12. Therefore, in the drive apparatus having a brake, in which the dry brake 25 is provided between the motor 1 and the speed reducer 2, the brake chamber 27 of the brake 25 adjacent to the motor 1 can be caused to double as an air chamber. As a result, a volume of the air chamber is increased to a combined volume of the brake chamber 27 and the interior of the motor housing 3, and therefore the air breather function can be realized more efficiently.

Further, in the second embodiment, the two partition walls 17, 31 are provided between the interior of the motor housing 3 and the speed reducer chamber 12, and therefore, even if the lubricating oil O infiltrates the brake chamber 27 from the speed reducer chamber 12, the lubricating oil is unlikely to advance into the motor housing 3. As a result, the air breather function can be secured even during an operation on sloping ground. More specifically, in the second embodiment, the brake chamber 27 exists between the interior of the motor housing 3 and the speed reducer chamber 12. Further, the upper portion partition wall 17 is provided between the interior of the motor housing 3 and the brake chamber 27, while the lower portion partition wall 31 is provided between the brake chamber 27 and the speed reducer chamber 12. Hence, inflow of the lubricating oil O can be limited while permitting a flow of air using the shaft sealing mechanisms 19, 32 provided on the respective partition walls 17, 31.

Furthermore, the recessed portion 32a is formed in the lower portion partition wall 31 by recessing a part of the upper surface of the lower portion partition wall 31 relative to the other parts thereof, and the air passage 34 is formed in the region constituting the bottom portion of the recessed portion 32a. Hence, even if the lubricating oil O infiltrates the brake chamber 27 from the speed reducer chamber 12, the lubricating oil O is highly likely to flow to the bottom portion of the recessed portion 32a and then return to the speed reducer chamber 12 through the air passage 34 in the lower portion shaft sealing mechanism 32.

Moreover, the recessed portion 19a is likewise formed in the upper portion partition wall 17. Therefore, even if the lubricating oil O infiltrates the interior of the motor housing 3, the lubricating oil O is highly likely to be led to the bottom portion of the recessed portion 19a and then discharged downward (to the brake chamber 27 and then into the speed reducer chamber 12) through the air passage 22 in the upper portion shaft sealing mechanism 19.

The specific embodiments described above mainly include inventions having the following configurations.

To solve the problems described above, the present invention provides a drive apparatus for a construction machine, including: an electric motor serving as a drive source and having a motor shaft and a motor housing; and a speed reducer that includes a speed reducer output shaft for transmitting a force to a driven portion, a speed reduction mechanism that reduces a rotation force of the motor shaft and transmits the reduced rotation force to the speed reducer output shaft, and a casing surrounding a speed reducer chamber in which the speed reduction mechanism is housed and lubricating oil is injected, and that is provided below the electric motor such that the motor shaft and the speed reducer output shaft are arranged along a same line, wherein an interior of the motor housing communicates with the speed reducer chamber such that a flow of air between the speed reducer chamber and the interior of the motor housing is permitted while limiting inflow of the lubricating oil into the interior of the motor housing from the speed reducer chamber, and an air breather for opening the interior of the motor housing to the atmosphere is provided in the motor housing.

The inventors of the present application arrived at the invention described above, in which the interior of the motor housing of the electric motor doubles as the air chamber of the air breather, by focusing on the fact that a dry space including no oil is formed in the interior of the motor housing. By causing the interior of the motor housing to double as an air chamber, there is no need to add a dedicated air chamber to the air breather.

Further, as described above, an electric motor capable of outputting equivalent torque to that of a hydraulic motor is larger than a hydraulic motor. Accordingly, the motor housing originally has a large enough volume to realize the air breather function. Hence, there is no need to increase the size of the drive apparatus in the height direction and the diametrical direction when causing the interior of the motor housing to double as an air chamber.

Therefore, a sufficient air breather function can be secured while achieving compactness in the height direction and the diametrical direction. As a result, the drive apparatus can be installed easily even in a construction machine having severe space limitations, such as a shovel.

In the drive apparatus for a construction machine described above, the electric motor preferably includes a motor side partition wall that partitions the interior of the motor housing from the speed reducer chamber, the motor shaft penetrating the motor side partition wall, and the motor side partition wall is preferably provided with a motor side shaft sealing mechanism that limits a flow of the lubricating oil between the motor side partition wall and the motor shaft, and a motor side air passage that permits a flow of air between the speed reducer chamber and the interior of the motor housing while limiting inflow of the lubricating oil into the interior of the motor housing from the speed reducer chamber.

According to this aspect, the motor side partition wall is provided to partition the interior of the motor housing from the speed reducer chamber. Therefore, in a drive apparatus in which the motor and the speed reducer are provided adjacent to each other, or in other words a drive apparatus in which the speed reducer chamber is close to the interior of the motor housing, inflow of the lubricating oil into the interior of the motor housing from the speed reducer chamber can be limited reliably by the partition wall and the shaft sealing mechanism provided thereon.

Further, for following reasons (a) to (c), the air breather function can be secured even during an operation on sloping ground, and overflow of the lubricating oil can be prevented reliably.

(a) The motor side shaft sealing mechanism is provided in the part of the motor side partition wall that is penetrated by the motor shaft.

(b) Inflow of the lubricating oil is limited by the motor side air passage.

(c) As described above, the oil level of the lubricating oil takes the funnel-shape during an operation. In other words, the oil level on the outer peripheral side of the drive apparatus is high, while the oil level on the inner peripheral side is low. According to the aspect described above, however, the motor side air passage is provided in the motor side partition wall partitioning the interior of the motor housing from the speed reducer chamber, and therefore the motor side air passage can be disposed further inward in comparison with the related art, in which a passage is formed on the outer peripheral side of the device. As a result, the risk of the lubricating oil flowing into the air chamber (the interior of the motor housing) is low.

In the drive apparatus for a construction machine described above, the motor side shaft sealing mechanism is preferably a non-contact type hermetic sealing mechanism in which a minute gap serving as the motor side air passage is formed between the motor side shaft sealing mechanism and the motor shaft when the motor shaft is inserted.

According to this aspect, the motor side air passage is provided in the part into which the motor shaft is inserted, where the oil level of the lubricating oil during an operation is at a minimum and the lubricating oil is unlikely to infiltrate even in a tilted condition. Therefore, inflow of the lubricating oil into the interior of the motor housing from the speed reducer chamber can be limited more reliably even during an operation performed on sloping ground, and a flow of air through the motor side air passage can be secured more reliably. As a result, an even more reliable air breather function can be obtained.

In the drive apparatus for a construction machine described above, a motor side recessed portion is preferably formed in the motor side partition wall by recessing a part of an upper surface of the motor side partition wall relative to another part thereof, and the motor side air passage is preferably formed in a region constituting a bottom portion of the motor side recessed portion.

According to this aspect, the motor side air passage is formed in the region constituting the bottom portion of the motor side recessed portion. Hence, even if the lubricating oil infiltrates the interior of the motor housing from the speed reducer chamber, the lubricating oil is highly likely to flow to the bottom portion of the motor side recessed portion and then return to the speed reducer chamber through the motor side air passage.

The drive apparatus for a construction machine described above preferably further includes a dry brake provided between the electric motor and the speed reducer, the brake including a brake mechanism for applying a brake to the motor shaft and a brake housing surrounding a brake chamber in which the brake mechanism is housed, wherein the brake housing includes a brake side partition wall that partitions the brake chamber from the speed reducer chamber, the motor shaft penetrating the brake side partition wall, the brake side partition wall is provided with a brake side shaft sealing mechanism that limits a flow of the lubricating oil between the brake side partition wall and the motor shaft and a brake side air passage that permits a flow of air between the speed reducer chamber and the brake chamber while limiting inflow of the lubricating oil into the brake chamber from the speed reducer chamber, and air is permitted to flow between the brake chamber and the interior of the motor housing.

According to this aspect, the brake side partition wall is provided to partition the brake chamber from the speed reducer chamber. Therefore, in the drive apparatus having a brake, in which the dry brake is provided between the motor and the speed reducer, the brake chamber of the brake adjacent to the motor can be caused to double as an air chamber. As a result, the volume of the air chamber is increased to the combined volume of the brake chamber and the interior of the motor housing, and therefore the air breather function can be realized more efficiently.

Further, for following reasons (a) to (d), the air breather function can be secured even during an operation on sloping ground, and overflow of the lubricating oil can be prevented reliably.
(a) The brake side shaft sealing mechanism is provided in the part of the brake side partition wall that is penetrated by the motor shaft.
(b) Infiltration of the lubricating oil into the brake chamber from the speed reducer chamber is limited by the brake side partition wall and the brake side shaft sealing mechanism provided thereon.
(c) The brake chamber is provided between the interior of the motor housing and the speed reducer chamber.
(d) As described above, the oil level of the lubricating oil takes the funnel-shape during an operation. In other words, the oil level on the outer peripheral side of the drive apparatus is high, while the oil level on the inner peripheral side is low. According to the aspect described above, however, the brake side air passage is provided in the brake side partition wall partitioning the brake chamber from the speed reducer chamber, and therefore the brake side air passage can be disposed further inward in comparison with the related art, in which a passage is formed on the outer peripheral side of the device. As a result, the risk of the lubricating oil flowing into the air chamber (the brake chamber and the interior of the motor housing) is low.

In the drive apparatus for a construction machine described above, the brake side shaft sealing mechanism is preferably a non-contact type hermetic sealing mechanism in which a minute gap serving as the brake side air passage is formed between the brake side shaft sealing mechanism and the motor shaft when the motor shaft is inserted.

According to this aspect, the brake side air passage is provided in the part into which the motor shaft is inserted, where the oil level of the lubricating oil during an operation is at a minimum and the lubricating oil is unlikely to infiltrate even in a tilted condition. Therefore, inflow of the lubricating oil into the brake chamber and the interior of the motor housing from the speed reducer chamber can be limited more reliably even during an operation performed on sloping ground, and a flow of air through the brake side air passage can be secured more reliably. As a result, an even more reliable air breather function can be obtained.

In the drive apparatus for a construction machine described above, a brake side recessed portion is preferably formed in the brake side partition wall by recessing a part of an upper surface of the brake side partition wall relative to another part thereof, and the brake side air passage is preferably formed in a region constituting a bottom portion of the brake side recessed portion.

According to this aspect, the brake side air passage is formed in the region constituting the bottom portion of the brake side recessed portion. Hence, even if the lubricating oil infiltrates the interior of the brake chamber from the speed reducer chamber, the lubricating oil is highly likely to flow to the bottom portion of the brake side recessed portion and then return to the speed reducer chamber through the brake side air passage.

In the drive apparatus for a construction machine described above, the electric motor preferably includes a motor side partition wall that partitions the interior of the motor housing from the brake chamber, the motor shaft penetrating the motor side partition wall, and the motor side partition wall is preferably provided with a motor side shaft sealing mechanism that limits a flow of the lubricating oil between the motor side partition wall and the motor shaft, and a motor side air passage that permits a flow of air between the brake chamber and the interior of the motor housing while limiting inflow of the lubricating oil into the interior of the motor housing from the brake chamber.

According to this aspect, the motor side partition wall provided with the motor side shaft sealing mechanism and the motor side air passage is further provided in addition to the brake side partition wall. Therefore, infiltration of the lubricating oil into the interior of the motor housing can be suppressed even more reliably by a double sealing effect between the speed reducer chamber and the brake chamber and between the brake chamber and the interior of the motor housing.

In the drive apparatus for a construction machine described above, the motor side shaft sealing mechanism is preferably a non-contact type hermetic sealing mechanism in which a minute gap serving as the motor side air passage is formed between the motor side shaft sealing mechanism and the motor shaft when the motor shaft is inserted.

According to this aspect, the motor side air passage is provided in the part into which the motor shaft is inserted, where the oil level of the lubricating oil during an operation is at a minimum and the lubricating oil is unlikely to infiltrate even in a tilted condition. Therefore, inflow of the lubricating oil into the interior of the motor housing from the speed reducer chamber can be limited more reliably even during an operation performed on sloping ground, and a flow of air through the motor side air passage can be secured more reliably. As a result, an even more reliable air breather function can be obtained.

In the drive apparatus for a construction machine described above, a motor side recessed portion is preferably formed in the motor side partition wall by recessing a part of an upper surface of the motor side partition wall relative to another part thereof, and the motor side air passage is preferably formed in a region constituting a bottom portion of the motor side recessed portion.

According to this aspect, the motor side air passage is formed in the region constituting the bottom portion of the motor side recessed portion. Hence, even if the lubricating oil infiltrates the interior of the motor housing from the speed reducer chamber, the lubricating oil is highly likely to flow to the bottom portion of the motor side recessed portion and then return to the speed reducer chamber through the motor side air passage.

In the drive apparatus for a construction machine described above, the electric motor preferably includes a rotation mechanism for applying a rotation force to the motor shaft, and the motor housing preferably houses the rotation mechanism.

Further, the present invention provides a construction machine including the drive apparatus described above, and a driven portion driven by the force transmitted via the speed reducer.

INDUSTRIAL APPLICABILITY

According to the present invention, a sufficient air breather function can be obtained while achieving compactness in a height direction and a diametrical direction.

EXPLANATION OF REFERENCE NUMERALS

O lubricating oil
1 electric motor
2 speed reducer
3 motor housing
4 casing
5 motor shaft
6 speed reducer output shaft
10 upper frame (driven portion)
12 speed reducer chamber
13, 14 planetary gear mechanism
17 partition wall (motor side partition wall)
19 shaft sealing mechanism (motor side shaft sealing mechanism)
19a recessed portion (motor side recessed portion)
20 connecting hole
21 seal plate
21a oil groove
22 air passage (motor side air passage)
23 air breather passage (air breather)
24 air breather pipe (air breather)
25 dry brake
26 brake housing
27 brake chamber
28 brake disc (brake mechanism)
29 spring (brake mechanism)
30 brake pad (brake mechanism)
31 partition wall (brake side partition wall)
32 shaft sealing mechanism (brake side shaft sealing mechanism)
32a recessed portion (brake side recessed portion)
33 seal plate
34 air passage (brake side air passage)
35 air vent

The invention claimed is:

1. A drive apparatus for a construction machine comprising:
   an electric motor serving as a drive source and having a motor shaft and a motor housing; and
   a speed reducer that includes a speed reducer output shaft for transmitting a force to a driven portion, a speed reduction mechanism that reduces speed of a rotation force of the motor shaft and transmits the reduced rotation force to the speed reducer output shaft, and a casing surrounding a speed reducer chamber in which the speed reduction mechanism is housed and lubricating oil is injected, and that is provided below the electric motor such that the motor shaft and the speed reducer output shaft are arranged along a same line,
   wherein
   an interior of the motor housing communicates with the speed reducer chamber such that a flow of air between the speed reducer chamber and the interior of the motor housing is permitted while limiting inflow of the lubricating oil into the interior of the motor housing from the speed reducer chamber,
   an air breather for opening the interior of the motor housing to the atmosphere is provided in the motor housing,
   the electric motor includes a motor side partition wall that partitions the interior of the motor housing from the speed reducer chamber, the motor shaft penetrating the motor side partition wall, and
   the motor side partition wall is provided with a motor side shaft sealing mechanism that limits a flow of the lubricating oil between the motor side partition wall and the motor shaft, and a motor side air passage that permits a flow of air between the speed reducer chamber and the interior of the motor housing while limiting inflow of the lubricating oil into the interior of the motor housing from the speed reducer chamber.

2. The drive apparatus for a construction machine according to claim 1, wherein the motor side shaft sealing mechanism is a non-contact type hermetic sealing mechanism in which a minute gap serving as the motor side air passage is formed between the motor side shaft sealing mechanism and the motor shaft when the motor shaft is inserted.

3. The drive apparatus for a construction machine according to claim 1, wherein
   a motor side recessed portion is formed in the motor side partition wall by recessing a part of an upper surface of the motor side partition wall relative to another part thereof, and
   the motor side air passage is formed in a region constituting a bottom portion of the motor side recessed portion.

4. A drive apparatus for a construction machine comprising:
   an electric motor serving as a drive source and having a motor shaft and a motor housing; and
   a speed reducer that includes a speed reducer output shaft for transmitting a force to a driven portion, a speed reduction mechanism that reduces speed of a rotation force of the motor shaft and transmits the reduced rotation force to the speed reducer output shaft, and a casing surrounding a speed reducer chamber in which the speed reduction mechanism is housed and lubricating oil is injected, and that is provided below the electric motor such that the motor shaft and the speed reducer output shaft are arranged along a same line,
   a dry brake provided between the electric motor and the speed reducer, the brake including a brake mechanism for applying a brake to the motor shaft and a brake housing surrounding a brake chamber in which the brake mechanism is housed,
   wherein an interior of the motor housing communicates with the speed reducer chamber such that a flow of air between the speed reducer chamber and the interior of the motor housing is permitted while limiting inflow of the lubricating oil into the interior of the motor housing from the speed reducer chamber,
   an air breather for opening the interior of the motor housing to the atmosphere is provided in the motor housing,
   the brake housing includes a brake side partition wall that partitions the brake chamber from the speed reducer chamber, the motor shaft penetrating the brake side partition wall,
   the brake side partition wall is provided with a brake side shaft sealing mechanism that limits a flow of the lubricating oil between the brake side partition wall and the motor shaft, and a brake side air passage that permits a flow of air between the speed reducer chamber and the brake chamber while limiting inflow of the lubricating oil into the brake chamber from the speed reducer chamber, and
   air is permitted to flow between the brake chamber and the interior of the motor housing.

5. The drive apparatus for a construction machine according to claim 4, wherein the brake side shaft sealing mechanism is a non-contact type hermetic sealing mechanism in which a minute gap serving as the brake side air passage is formed between the brake side shaft sealing mechanism and the motor shaft when the motor shaft is inserted.

6. The drive apparatus for a construction machine according to claim 4, wherein a brake side recessed portion is formed in the brake side partition wall by recessing a part of an upper surface of the brake side partition wall relative to another part thereof, and the brake side air passage is formed in a region constituting a bottom portion of the brake side recessed portion.

7. The drive apparatus for a construction machine according to claim 4, wherein the electric motor includes a motor side partition wall that partitions the interior of the motor housing from the brake chamber, the motor shaft penetrating the motor side partition wall, and the motor side partition wall is provided with a motor side shaft sealing mechanism that limits a flow of the lubricating oil between the motor side partition wall and the motor shaft, and a motor side air passage that permits a flow of air between the brake chamber and the interior of the motor housing while limiting inflow of the lubricating oil into the interior of the motor housing from the brake chamber.

8. The drive apparatus for a construction machine according to claim 7, wherein the motor side shaft sealing mechanism is a non-contact type hermetic sealing mechanism in which a minute gap serving as the motor side air passage is formed between the motor side shaft sealing mechanism and the motor shaft when the motor shaft is inserted.

9. The drive apparatus for a construction machine according to claim 7, wherein a motor side recessed portion is formed in the motor side partition wall by recessing a part of an upper surface of the motor side partition wall relative to another part thereof, and the motor side air passage is formed in a region constituting a bottom portion of the motor side recessed portion.

10. The drive apparatus for a construction machine according to claim 1, wherein the electric motor includes a rotation mechanism for applying a rotation force to the motor shaft, and the motor housing houses the rotation mechanism.

11. A construction machine comprising:

the drive apparatus according to claim 1; and a driven portion driven by the force transmitted via the speed reducer.

* * * * *